(12) United States Patent
Jeong et al.

(10) Patent No.: US 9,292,524 B2
(45) Date of Patent: Mar. 22, 2016

(54) FILE SYSTEM AND FILE STORING METHOD

(71) Applicant: Samsung Electronics Co., Ltd., Suwon-Si, Gyeonggi-Do (KR)

(72) Inventors: Sung-Won Jeong, Gyeonggi-do (KR); Yun-Gun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 474 days.

(21) Appl. No.: 13/719,438

(22) Filed: Dec. 19, 2012

(65) Prior Publication Data

US 2013/0166611 A1 Jun. 27, 2013

(30) Foreign Application Priority Data

Dec. 21, 2011 (KR) .................. 10-2011-0139304

(51) Int. Cl.
*G06F 17/30* (2006.01)
(52) U.S. Cl.
CPC .... *G06F 17/30091* (2013.01); *G06F 17/30067* (2013.01)
(58) Field of Classification Search
CPC .................. G06F 17/30067; G06F 17/30182; G06F 11/1435; G06F 21/79
USPC ........... 707/822, 825, 826; 711/100, 103, 113
See application file for complete search history.

(56) References Cited

U.S. PATENT DOCUMENTS

| | | | | |
|---|---|---|---|---|
| 4,897,782 A * | 1/1990 | Bennett | ............. | G06F 17/30067 |
| 5,333,315 A * | 7/1994 | Saether | ................. | G06F 3/0601 |
| 6,286,013 B1 * | 9/2001 | Reynolds | .......... | G06F 17/30123 |
| | | | | 707/823 |
| 6,496,977 B1 * | 12/2002 | Hamilton, II | ............. | G06F 8/71 |
| | | | | 707/999.202 |
| 6,604,170 B1 * | 8/2003 | Suzuki | .............. | G06F 17/30067 |
| | | | | 707/999.001 |
| 8,095,678 B2 * | 1/2012 | Worrall | .................. | G06F 3/0611 |
| | | | | 707/822 |
| 2002/0048105 A1 * | 4/2002 | Shin | .................. | G06F 17/30017 |
| | | | | 360/1 |
| 2003/0093611 A1 * | 5/2003 | Schulze | ................ | G06F 3/0604 |
| | | | | 711/103 |
| 2005/0080985 A1 * | 4/2005 | Sasaki | .................... | G06F 3/0607 |
| | | | | 711/103 |
| 2007/0067367 A1 * | 3/2007 | Agarwal | ............. | G06F 17/3012 |
| 2007/0094315 A1 * | 4/2007 | Seo | ......... | G06F 17/301 |
| 2007/0174367 A1 * | 7/2007 | Shapiro | ..................... | G06F 8/61 |
| 2007/0250540 A1 * | 10/2007 | Hsu | .................... | G06F 17/30233 |
| 2009/0240750 A1 * | 9/2009 | Seo | ......................... | G06F 17/30 |
| 2009/0271418 A1 * | 10/2009 | Vaghani | .............. | G06F 11/1435 |
| 2012/0179730 A1 * | 7/2012 | Slegers | ............. | G06F 17/30227 |
| | | | | 707/822 |
| 2012/0221609 A1 * | 8/2012 | Boor | ................. | G06F 17/30321 |
| | | | | 707/822 |
| 2013/0110889 A1 * | 5/2013 | Shogome | .......... | G06F 17/30115 |
| | | | | 707/823 |
| 2014/0304285 A1 * | 10/2014 | An | ..................... | G06F 17/30091 |
| | | | | 707/756 |

FOREIGN PATENT DOCUMENTS

JP 07-121414 A 5/1995
JP 2002-222105 A 8/2002

* cited by examiner

*Primary Examiner* — Pierre Vital
*Assistant Examiner* — Nargis Sultana
(74) *Attorney, Agent, or Firm* — Harness, Dickey & Pierce (57) ABSTRACT

Provided is a storage device configured to store a file system including (1) a personality oriented file information (PFI) directory entry including a first directory entry having a file allocation table (FAT) structure, and a second directory entry having a structure different from that of the first directory entry, the second directory entry including additional information instructing an access device on at least one parameter associated with creation and storing of a storage file, and (2) an entry table including location information of the PFI directory entry.

14 Claims, 11 Drawing Sheets

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | PFI_ord (105) | PFI_A (110) | PFI_N (115) | PFI_T1 (120) | PFI 1 (125) | | | PFI_T2 (130) | PFI 2 (135) | | | Attr (140) | Type (145) | Chk sum (150) | PFI_T3 (155) | PFI_3 (160) |
| 0x10 | PFI 3 (160) | | PFI_T4 (170) | | PFI 4 (175) | | PFI_T5 (180) | | PFI 5 (185) | | 1st Clus Low (190) | | PFI_T6 (195) | | PFI 6 (199) | |

— 100

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | Create Date | | Last Acc Date | | First Clus Hi | | Write Time | | Write Date | | Extender | Attr | NT Res | CTT | Create Time | |
| 0x10 | Name | | | | | | | | | | First Clus Low | | File Size | | | |

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | PFI_ord (205) | PFI_A (210) | PFI_N (215) | PFI_T1 (220) | PFI 1 (225) | | | | | PFI_T2 (230) | PFI 2 (235) | Attr (240) | Type (245) | Chk sum (250) | PFI 2 (235) | |
| 0x10 | PFI 2 (235) | PFI_T3 (255) | | | PFI 3 (260) | | | | PFI_T4 (265) | PFI 4 (270) | 1st Clus Low (275) | PFI 4 (270) | | | | |

(200)

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | Name | | | | | | | | Extender | | | Attr | NT Res | CTT | Create Time | |
| 0x10 | Create Date | Last Acc Date | | First Clus Hi | | Write Time | | Write Date | | First Clus Low | | File Size | | | | |

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | 0x EF | PFI_A | PFI_N | PFI_T & PFI {[(N-1)x4]+1} ~ {[(N-1)x4]+4} | | | | | | | | Attr | Type | Chk sum | | |
| 0x10 | | | | | | | | | | | 1st Clus Low | | | | | |

200-79 ⎯⎯⎯⎯⎯⎯⎯⎯⎯ 200

⋯ PFI Dentry (Max 79) ⋯

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | 0x A1 | PFI_A | PFI_N | PFI_T1 | | | PFI 1 | | PFI_T2 | PFI 2 | | Attr | Type | Chk sum | PFI 2 | |
| 0x10 | PFI 2 | | PFI_T3 | | PFI 3 | | | | PFI_T4 | PFI 4 | 1st Clus Low | | | PFI 4 | | |

200-1

| | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 0x00 | | | Last Acc Date | | Name | | | Write Time | | Extender | | Attr | NT Res | CTT | Create Time | |
| 0x10 | Create Date | | | | First Clus Hi | | | | Write Date | | First Clus Low | | | File Size | | |

| | PFI Dentry (Max 79) | | | | | | | |
|---|---|---|---|---|---|---|---|---|
| 0x A2 | PFI_A | 0x 06 | PFI_T7 | PFI 7 | PFI_T8 | PFI 8 | 0x 0F | Type | Chk sum | PFI_T9 | PFI_9 |
| PFI 9 | | PFI_T10 | PFI 10 | PFI_T11 | PFI 11 | 0x0000 | | PFI_T12 | PFI 12 |
| 0x A1 | PFI_A | 0x 06 | PFI_T1 | PFI 1 | PFI_T2 | PFI 2 | 0x 0F | Type | Chk sum | PFI_T3 | PFI_3 |
| PFI 3 | | PFI_T4 | PFI 4 | PFI_T5 | PFI 5 | 0x0000 | | PFI_T6 | PFI 6 |

... 100-2, 100-1 } 100

| | LFNs Dentry (Max 20) | | |
|---|---|---|---|
| 0x 54 | Name (20+1) | Name (20+2) | 0x 0F | 0x00 | Chk sum | Name (20+2) | Name (20+3) |
| 0x 01 | Name 1 | Name 2 | 0x 0F | 0x00 | Chk sum | Name 2 | Name 3 |

80-20, 80-1 } 80

| Name | Extender | Attr | NT Res | CTT | Create Time |
|---|---|---|---|---|---|
| Create Date | Last Acc Date | First Clus Hi | Write Time | Write Date | First Clus Low | File Size |

FILE SYSTEM AND FILE STORING METHOD

CROSS-REFERENCE TO RELATED APPLICATION

This application claims priority from Korean Patent Application No. 10-2011-0139304 filed on Dec. 21, 2011 in the Korean Intellectual Property Office, and all the benefits accruing therefrom under 35 U.S.C. 119, the contents of which in its entirety are herein incorporated by reference.

BACKGROUND

1. Technical Field

Example embodiments relate to a file system and file storing method.

2. Description of the Related Art

Among file systems for storing and exploring data, a file allocation table (FAT) file system is most widely used in current mobile devices and the Windows environment, as the FAT file system has excellent compatibility. The FAT is a kind of index used to configure a storage space of a storage medium, such as a hard disk. This table organizes and structures the information on the file stored in the storage medium to enable positioning of each part of the file through predetermined rules. For example, the FAT system allows an operating system (OS) to find out which cluster of the storage medium stores a file or directory.

With the increase in mobility of the storage medium, additional information on the file (such as a location (GPS) where the file has been stored and weather environment at the time that the file has been stored) is increasingly useful. If the additional information is stored together with the file, the additional information may be used for various purposes.

If the additional information is compatible with the FAT file system having excellent compatibility, its usefulness can be further improved.

SUMMARY

Some example embodiments provide a file system capable of storing additional information on a file to be compatible with a FAT file system.

Some example embodiments provide a file storing method capable of storing additional information on a file to be compatible with a FAT file system.

According to an example embodiment, there is provided a storage device configured to store a file system including (1) a personality oriented file information (PFI) directory entry including a first directory entry having a file allocation table (FAT) structure, and a second directory entry having a structure different from that of the first directory entry, the second directory entry including additional information instructing an access device on at least one parameter associated with storage of a storage file, and (2) an entry table including location information of the PFI directory entry.

According to another example embodiment, there is provided a file storing method comprising: receiving, by a processor, additional information on a storage file; and storing, by a processor, a PFI directory entry including the additional information on the storage file in a storage medium, wherein the PFI directory entry includes a first directory entry having a FAT structure, and a second directory entry including the additional information on the storage file.

According to an example embodiment, there is provided a storage device configured to store a file having a first file structure, the storage device configured to receive additional information regarding the file and to link the additional information to the file so that accessing, duplicating or moving the file also accesses, duplicates and moves the additional information, the additional information including a first portion having the first file structure and a second portion having a second file structure, the second file structure different than the first file structure.

BRIEF DESCRIPTION OF THE DRAWINGS

The above and other aspects and features of the present invention will become more apparent by describing in detail example embodiments thereof with reference to the attached drawings, in which.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Advantages and features of the present invention and methods of accomplishing the same may be understood more readily by reference to the following detailed description of example embodiments and the accompanying drawings. The present invention may, however, be embodied in many different forms and should not be construed as being limited to the example embodiments set forth herein. Rather, these example embodiments are provided so that this disclosure will be thorough and complete and will fully convey the concept of the invention to those skilled in the art, and the present invention will only be defined by the appended claims. In the drawings, the thickness of layers and regions are exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless defined otherwise, all technical and scientific terms used herein have the same meaning as commonly understood by one of ordinary skill in the art to which this invention belongs. It is noted that the use of any and all examples, or example terms provided herein is intended merely to better illuminate the invention and is not a limitation on the scope of the invention unless otherwise specified. Further, unless defined otherwise, all terms defined in generally used dictionaries may not be overly interpreted.

Hereinafter, a computing system configured to include a file system in accordance with some example embodiments will be described with reference to FIG. 1.

Figure 1:
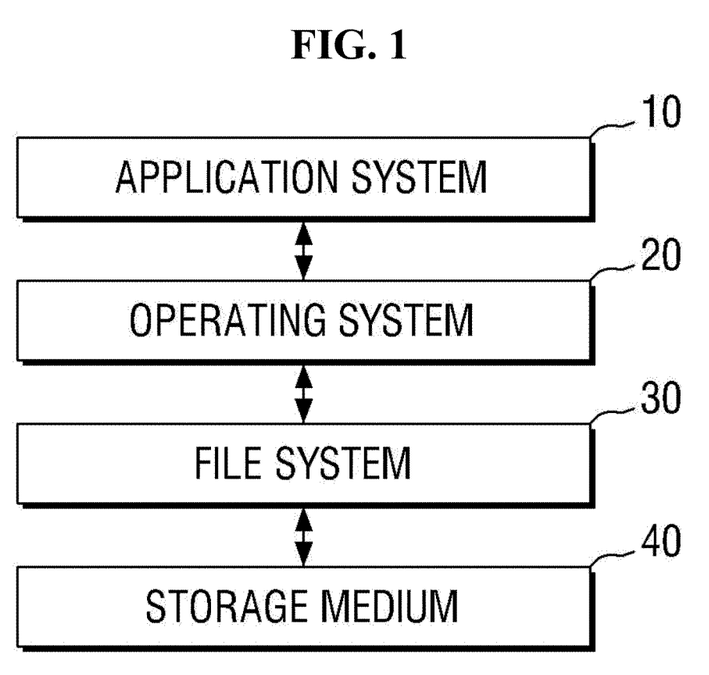
FIG. 1 is a block diagram showing an example of a computing system configured to include a file system in accordance with some example embodiments.

FIG. 1 is a block diagram showing an example of a computing system configured to include a file system in accordance with some example embodiments.

It will be understood that each block of the flowchart illustrations and combinations of blocks in the flowchart illustrations can be implemented by computer program instructions. These computer program instructions can be provided to a processor of a general purpose computer, special purpose computer, or other programmable data processing apparatus to produce a specific purpose machine, such that the instructions, which execute via the processor of the computer or other programmable data processing apparatus, implement the functions specified in the flowchart block or blocks.

These computer program instructions may also be stored in a computer usable or computer-readable non-transitory memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a specific computer implemented process such that the instructions that execute on the computer or other programmable apparatus provide steps for implementing the functions specified in the flowchart block or blocks.

Each block may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Referring to FIG. 1, the computing system may include an application system 10, an operating system 20, a file system 30 and a storage medium 40.

The application system 10 may include various user applications requesting access to a specific file stored in the storage medium 40. The operating system 20 may provide an interface enabling communication between the application system 10 and the file system 30 to the application system 10 and the file system 30. The operating system 20 may receive a command from the application system 10 and interface with the file system 30 if the command is a request for access to a specific file stored in the storage medium 40.

The storage medium 40 may be a tangible, physical medium capable of storing data. The storage medium 40 may be configured by combination of various logical units. A hard disk device may be an example of the storage medium 40. If the storage medium 40 is a hard disk device, the storage medium 40 may include a plurality of sectors and cylinders. A non-volatile memory device may be employed as the storage medium 40 in some example embodiments.

The file system 30 that has received a command from the application system 10 through the operating system 20 may interface with the storage medium 40 to read a file stored in the storage medium 40 or write a new file in the storage medium 40. The file system 30 may include a directory entry (Dentry) and an entry table in order to perform a series of operations. The file system 30 in accordance with some example embodiments may include a personality oriented file information (PFI) directory entry 32 (see FIG. 2) in order to store additional information on each file stored in the storage medium 40.

A file system in accordance with an example embodiment will be described in detail with reference to FIGS. 2 and 3.

Figure 2:
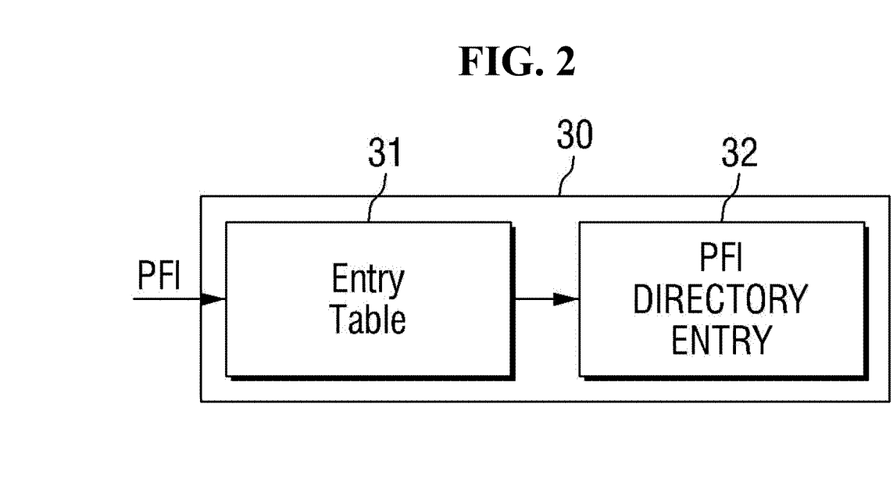
FIG. 2 is a block diagram showing a file system in accordance with some example embodiments.

FIG. 2 is a block diagram showing a file system in accordance with some example embodiments. FIG. 3 illustrates a configuration of a personality oriented file information (PFI) directory entry (Dentry) in accordance with an example embodiment.

Referring to FIG. 2, the file system 30 may include an entry table 31 and the PFI directory entry 32.

The entry table 31 may include location information of the PFI directory entry 32. The entry table 31 may be stored, for example, in the storage medium 40, and may be implemented in the form of a table having location information of each PFI directory entry 32 in the storage medium 40.

The PFI directory entry 32 may include a first directory entry having a file allocation table (FAT) structure and a second directory entry having a structure different from that of the first directory entry. Additional information (e.g., PFI) on a storage file stored in the storage medium 40 may be stored in the second directory entry.

The additional information (e.g., PFI) on the storage file may be provided from the application system 10 (see FIG. 1). For example, the application system 10 (see FIG. 1) may request the file system 30 to store a new file in the storage medium 40 (see FIG. 1) through the operating system 20 (see FIG. 1), and at the same time, provide the additional information (e.g., PFI) on the storage file to the file system 30. The additional information (e.g., PFI) provided to the file system 30 from the application system 10 (see FIG. 1) may include, for example, location information (such as GPS location information) and weather information (such as humidity information) at the time when the user has created the storage file, voice information of the user who has created the storage file, and the like.

The PFI directory entry 32 may also be written and stored, for example, in the storage medium 40 (see FIG. 1). A more detailed description thereof will be described below with reference to FIG. 3.

Figure 3:
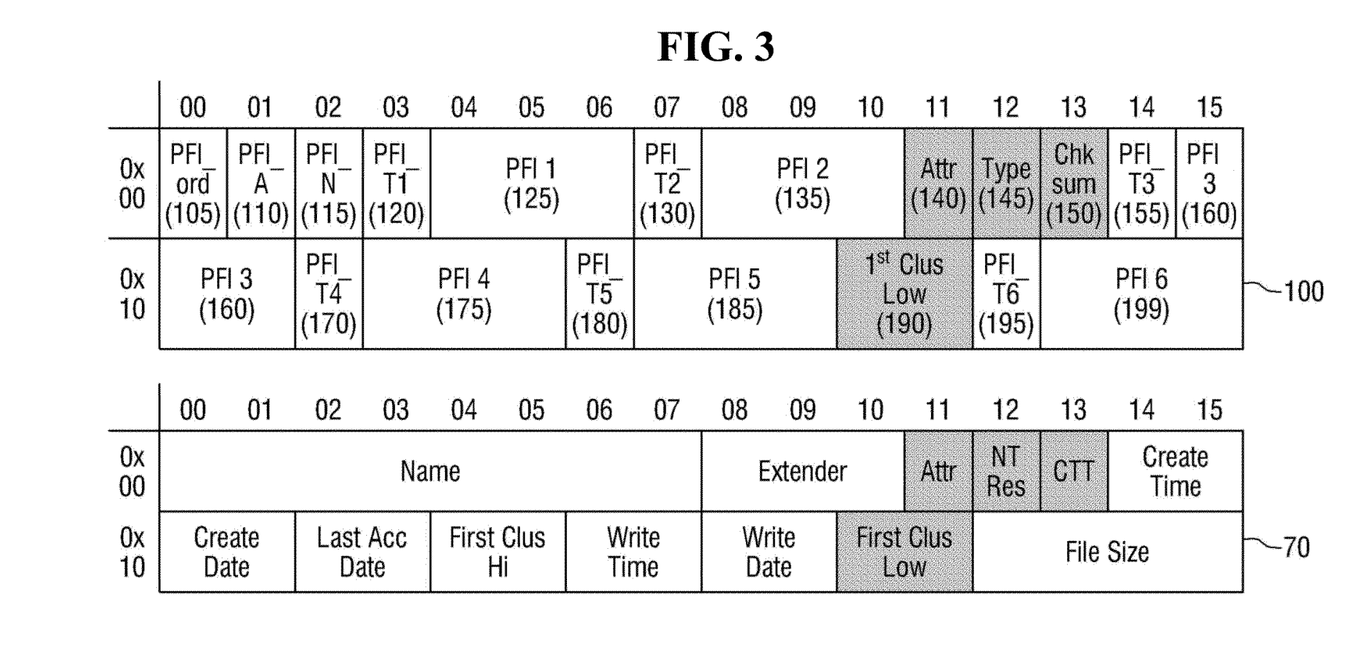
FIG. 3 illustrates a configuration of a personality oriented file information (PFI) directory entry (Dentry) in accordance with an example embodiment.

Referring to FIG. 3, the PFI directory entry 32 may include a first directory entry 70 having a file allocation table (FAT) structure and a second directory entry 100 having the additional information (e.g., PFI) on the storage file stored in the storage medium 40. It can be understood that the PFI directory entry 32 in accordance with this example embodiment is configured such that the second directory entry 100 storing the additional information (e.g., PFI) on the storage file is added to the first directory entry 70 having a FAT structure compatible with the file system of a FAT structure. In the following description, the additional information on the storage file is collectively referred to as personality oriented file information (PFI).

The first directory entry 70 may include various fields as illustrated. The fields included in the first directory entry 70 have the same structure as that of the directory entry generally used in the FAT file system and, thus, a repeated detailed description thereof will be omitted.

The second directory entry 100 may include a first region storing the PFI on the storage file, and a second region storing information for compatibility with the FAT structure.

The first region may include an order field 105 storing a sequence order of each directory entry, an attribute field 110 storing an attribute value indicating the attribute of PFI, a PFI number filed 115 storing a value indicating the number of pieces of PFI written in each directory entry, type fields 120, 130, 155, 170, 180 and 195 each storing a type value indicating the type of each piece of PFI, and PFI fields 125, 135, 160, 175, 185 and 199 storing the PFI. The second region may include fields 140, 145, 150 and 190 storing information for compatibility with the FAT structure.

The order field 105 is a field storing a sequence order of each directory entry. In this example embodiment, a start order of the second directory entry 100 may be OxA1. As will be described in detail later, this can be understood such that the order of the directory entry is set with a wide margin considering that the first directory entry 70 may include an extension directory entry (not shown) having a long file name (LFN) structure.

The attribute field 110 may store an attribute value indicating the attribute of PFI. The attribute value may include, for example, a value indicating a read only attribute, a value indicating a hidden attribute, and the like.

The PFI number filed 115 may store a value indicating the number of pieces of PFI written in each directory entry. Referring to FIG. 3, in this example embodiment, since the number of the PFI fields 125, 135, 160, 175, 185 and 199 included in the second directory entry 100 is six, any one value of 1 to 6 may be stored in the PFI number filed 115. If the value stored in the PFI number filed 115 is one, it means that PFI is stored only in any one (for example, PFI field 125) of the six PFI fields 125, 135, 160, 175, 185 and 199 included in the second directory entry 100 and PFI is not stored in the other PFI fields (for example, PFI fields 135, 160, 175, 185 and 199). If the value stored in the PFI number filed 115 is six, it means that PFI is stored in all of the six PFI fields 125, 135, 160, 175, 185 and 199 included in the second directory entry 100.

The type fields 120, 130, 155, 170, 180 and 195 may store type values indicating the types of pieces of PFI stored in the respective PFI fields 125, 135, 160, 175, 185 and 199. So that the type fields 120, 130, 155, 170, 180 and 195 correspond one-to-one to the PFI fields 125, 135, 160, 175, 185 and 199, the second directory entry 100 of this example embodiment may include the type fields 120, 130, 155, 170, 180 and 195 provided in the same number as the PFI fields 125, 135, 160, 175, 185 and 199.

For example, if the GPS location information on the storage file is stored in the first PFI field 125, 0x01 may be stored in the corresponding first type field 120. If the humidity information on the storage file is stored in the second PFI field 135, 0x02 may be stored in the corresponding second type field 130. If the voice information of the user who has created the storage file is stored in the third PFI field 160, 0x03 may be stored in the corresponding third type field 155. The type fields 120, 130, 155, 170, 180 and 195 may store the type values indicating the types of PFI stored in the corresponding PFI fields 125, 135, 160, 175, 185 and 199, respectively.

In this example embodiment, the fields 140, 145, 150 and 190 included in the second region may store values for compatibility with the FAT structure. For example, the first field 140 may store OxOF, and the second field 145 may store a value other than 0. The third field 150 may store a checksum for PFI stored, for example, in the second directory entry 100, and the fourth field 190 may be fixed to 0 for compatibility with the FAT structure. The third field 150 may be used as an error check field for checking whether there is an error in the PFI included in the second directory entry 100.

As described above, the file system 30 in accordance with this example embodiment comprises, as illustrated, the PFI directory entry including the first directory entry 70 and the second directory entry 100, so that the file system 30 can store the additional information on the storage file to be compatible with the FAT file system.

Meanwhile, although storing up to six pieces of PFI on the storage file has been illustrated in FIG. 3, the present invention is not limited thereto. The number of pieces of PFI on the storage file may need to be extended to be greater than six depending on the environment in which the system is used. Hereinafter, a file system having more extended PFI than the above-described example embodiment will be described with reference to FIG. 4.

Figure 4:
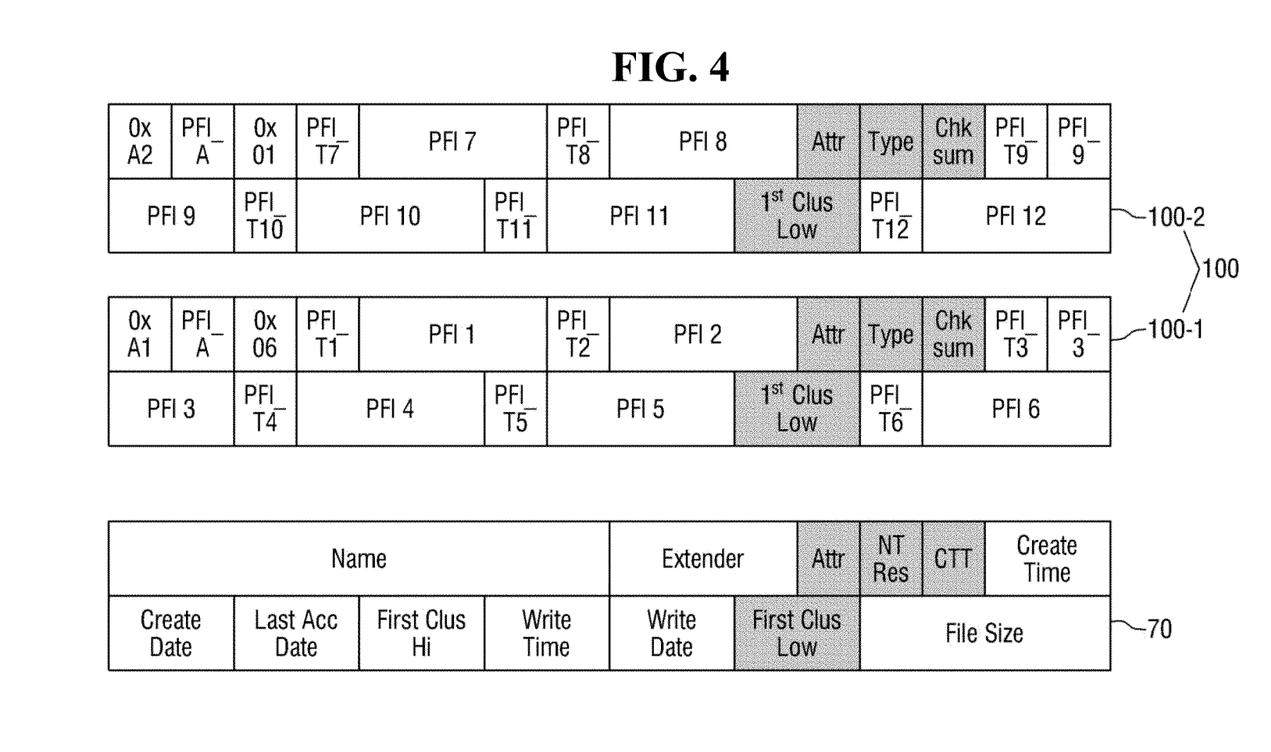
FIG. 4 illustrates a configuration of a PFI directory entry in accordance with another example embodiment.

FIG. 4 illustrates a configuration of a PFI directory entry in accordance with another example embodiment.

Referring to FIG. 4, the PFI directory entry 32 of the file system 30 (see FIG. 2) may comprise second directory entries 100 including a second directory entry 100-1 and a second directory entry 100-2.

By increasing the number of the second directory entries 100, it is possible to increase the amount of information that can be additionally stored for a specific storage file. The second directory entry 100-1 has the same structure as described above, and the second directory entry 100-2 may include six additional PFI fields PFI 7 to 12 and six corresponding type fields PFI_T7 to PFI_T12. Since other fields have the same structure as described above, a repeated description thereof will be omitted.

Referring to FIG. 4, it can be seen that 0x06 is stored in the PFI number field of the second directory entry 100-1 and 0x01 is stored in the PFI number field of the second directory entry 100-2. The PFI on the storage file is stored only in any one (for example, PFI 7) among the six PFI fields PFI 7 to 12 included in the second directory entry 100-2. The first directory entry 70 includes one directory entry in the same way as in the above-described example embodiment, and a description of a detailed structure will also be omitted.

Meanwhile, as has been illustrated in FIGS. 3 and 4, each PFI field stores 3 bytes of PFI. However, the size of PFI may need to be further extended. Hereinafter, a file system in which each PFI field has a more extended size will be described with reference to FIG. 5.

Figure 5:
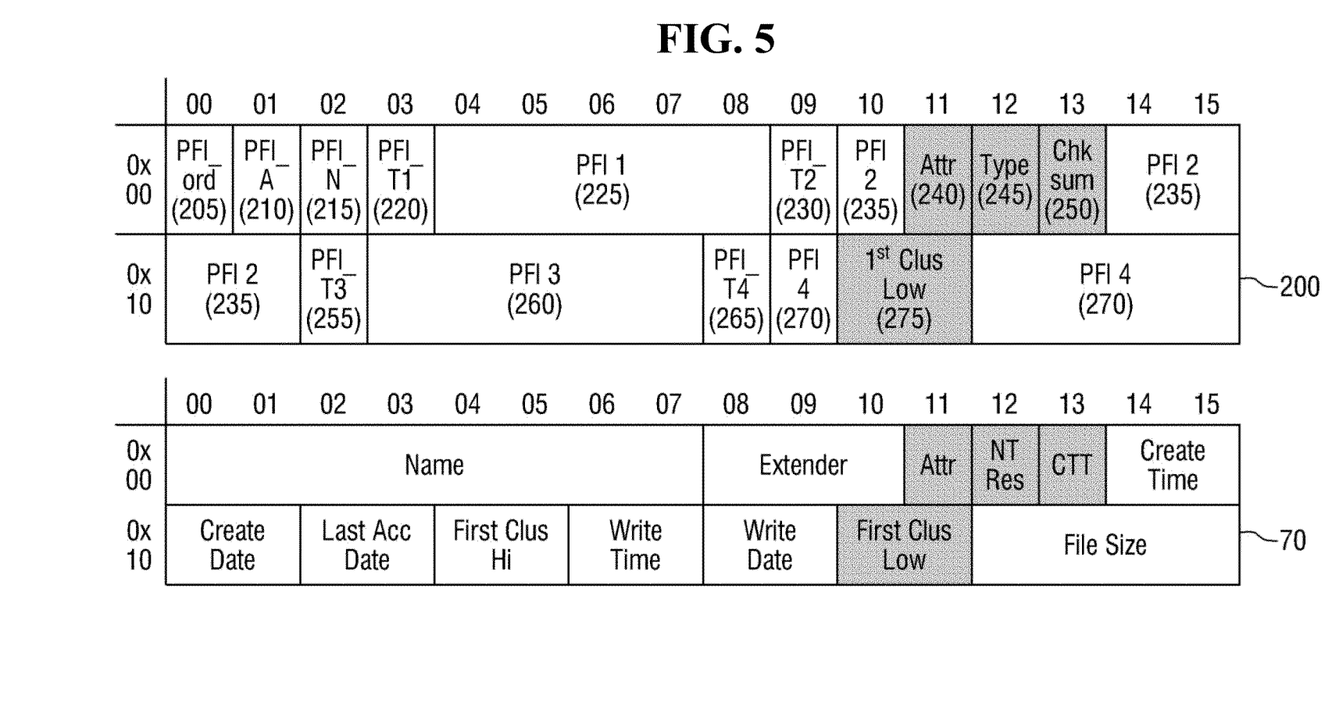
FIGS. 5 to 7 illustrate configurations of PFI directory entries in accordance with still other example embodiments.

FIG. 5 illustrates a configuration of a PFI directory entry in accordance with still other example embodiments.

Referring to FIG. 5, the PFI directory entry 32 of the file system 30 (see FIG. 2) may include four PFI fields 225, 235, 260 and 270, each having a size of 5 bytes. The PFI directory entry 32 (see FIG. 2) may also include four type fields 220, 230, 255 and 265 such that the type fields 220, 230, 255 and 265 correspond to the PFI fields 225, 235, 260 and 270, respectively.

By increasing the size of each of the PFI fields 225, 235, 260 and 270, the storage capacity can be increased such that more detailed information can be stored for each piece of PFI. For example, more precise location and weather information at the time when the storage file has been written, or higher quality of voice information of the user of the storage file may be stored.

Each PFI field has a size of 3 bytes and 5 bytes in FIGS. 4 and 5, respectively, but the present invention is not limited thereto. In some example embodiments, the size of each PFI field may be modified in any way.

If the size of each type field is 1 byte and the size of each PFI field is k bytes (k is a natural number), the number n of PFI fields included in one of the second directory entries 100 and 200 may be calculated by the following equation:

$$n=24/(1+k),$$

where n is a natural number.

Although not shown above, one of the second directory entries 100 and 200 may include twelve PFI fields having a size of 1 byte, may include eight PFI fields having a size of 2 bytes, or may include three PFI fields having a size of 7 bytes. Since each structure of these modification examples can be easily inferred by those skilled in the art from the above-described example embodiments and the above equation, a detailed description thereof will be omitted.

Since other components of FIG. 5 are the same as those of the above-described example embodiments, a repeated description thereof will be omitted.

Figure 6:
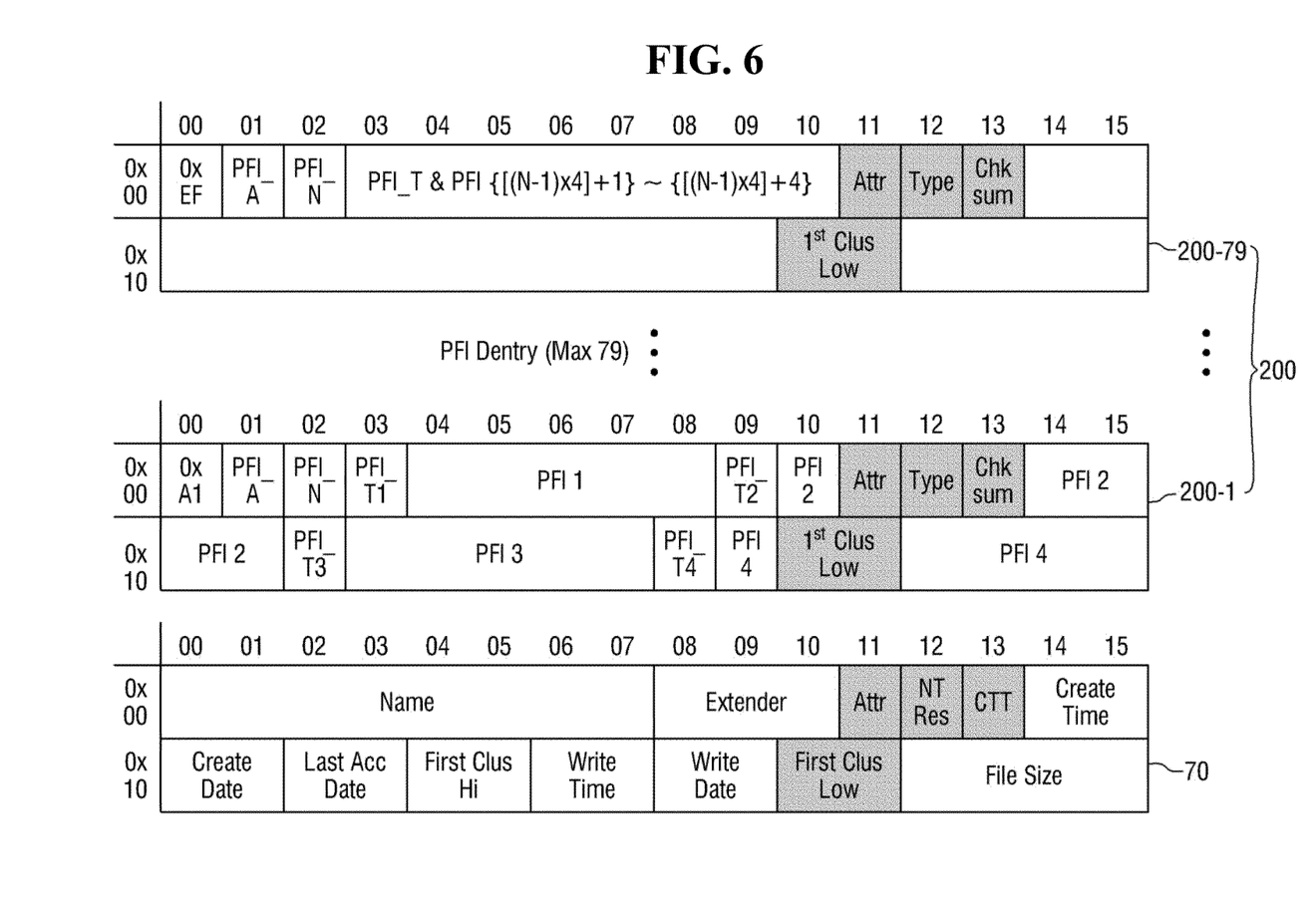

FIG. 6 illustrates a configuration of a PFI directory entry in accordance with still other example embodiments.

Referring to FIG. 6, the PFI directory entry 32 (see FIG. 2) in accordance with the example embodiments may include a maximum number of the second directory entries 200. In this example embodiment, the number of the second directory entries 200 may be extended up to seventy nine (79). The order of the second directory entries 200 extended to the maximum may be OxEF as illustrated, and the second directory entries 200 extended to the maximum may store up to three hundred sixteen (316) pieces of PFI on the storage file.

Although one of the second directory entries 200 includes four PFI fields having a size of 5 bytes in FIG. 6, the present invention is not limited thereto as described above. For example, if one of the second directory entries 100 (see FIG. 4) includes six PFI fields having a size of 3 bytes, the number of the second directory entries 100 (see FIG. 4) may be extended up to seventy nine (79). The second directory entries 100 (see FIG. 4) extended to the maximum may store up to four hundred seventy four (474) pieces of PFI on the storage file.

Figure 7:
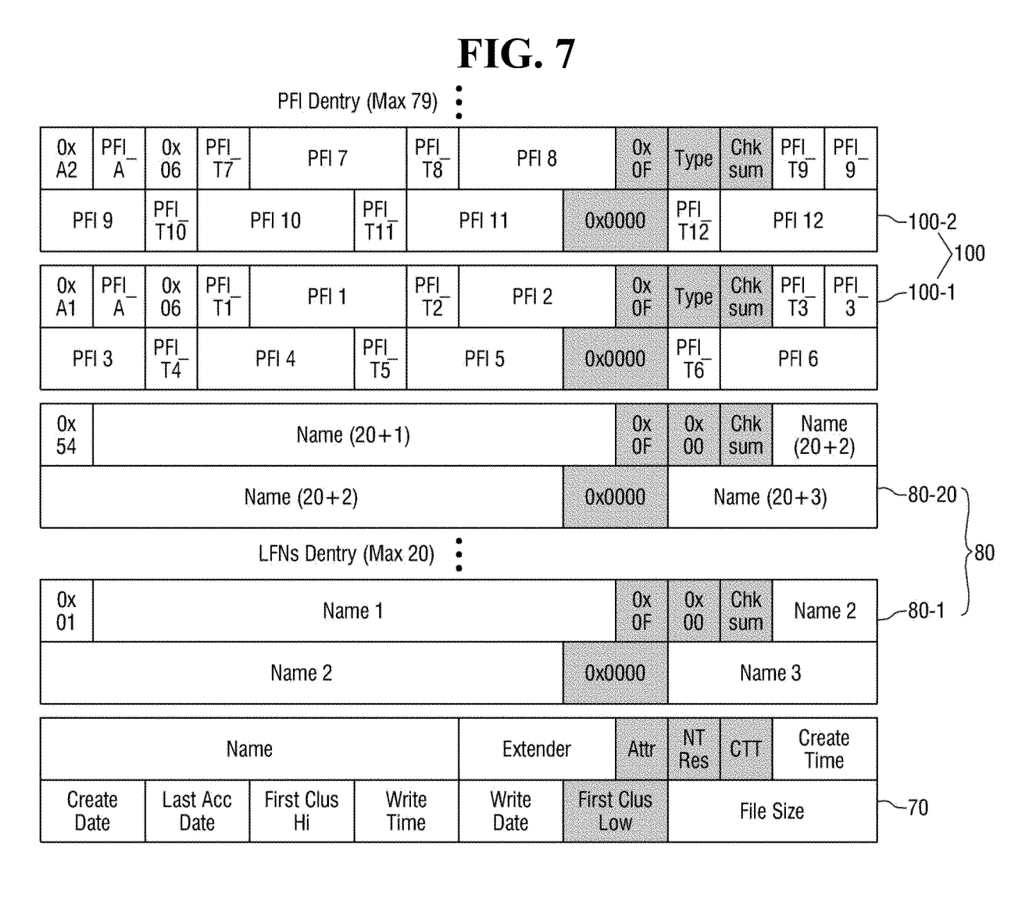

FIG. 7 illustrates a configuration of a PFI directory entry in accordance with still other example embodiments.

Referring to FIG. 7, the first directory entry 70 of the PFI directory entry 32 (see FIG. 2) may further include extension directory entries 80 having a long file name (LFN) structure. The extension directory entries 80 having the LFN structure may be extended up to twenty extension directory entries 80-1 to 80-20. The number of the second directory entries 100 may be extended up to seventy nine (79).

The extension directory entries 80 having the LFN structure may include various fields as illustrated. The fields included in the extension directory entries 80 having the LFN structure have the same structure as that of the directory entry generally used in the FAT file system and, thus, a repeated detailed description thereof will be omitted.

A file storing method in accordance with an example embodiment will be described with reference to FIG. 8.

Figure 8:
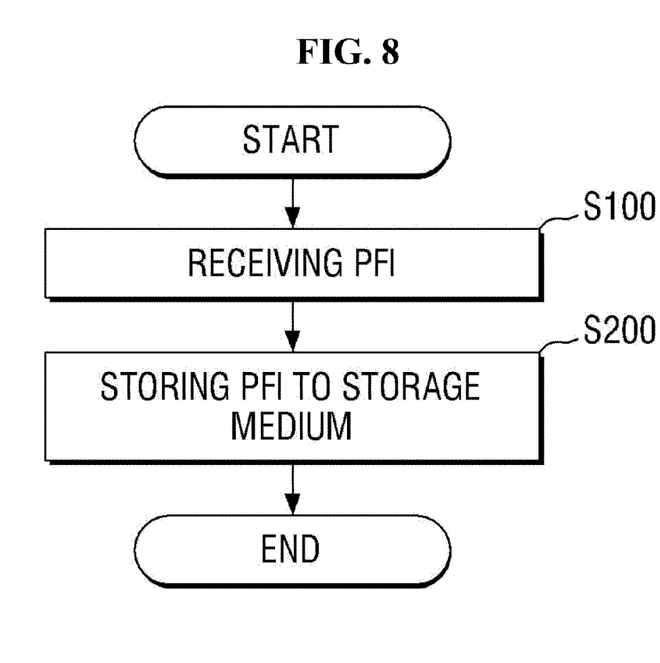
FIG. 8 is a flowchart showing a file storing method in accordance with an example embodiment.

FIG. 8 is a flowchart showing a file storing method in accordance with an example embodiment.

Referring to FIG. 8, additional information on the storage file is received (step S100). The additional information may be the personality oriented file information (PFI) on the storage file as described above. The PFI may be collected and provided from the application system 10 (see FIG. 1).

The PFI directory entry including the additional information on the storage file may be stored in the storage medium (step S200).

The storage medium 40 (see FIG. 1) may store not only the PFI directory entry 32 (see FIG. 2) but also the entry table 31 (see FIG. 2) storing the location information of the PFI directory entry 32 (see FIG. 2) in the storage medium 40 (see FIG. 1).

The PFI directory entry 32 (see FIG. 2) stored in the storage medium 40 (see FIG. 1) may comprise the first directory entry of the FAT structure and the second directory entry including the PFI on the storage file. Since this configuration has been described in detail above, a description thereof will be omitted.

Hereinafter, a memory system in accordance with some example embodiments and application examples thereof will be described with reference to FIGS. 9 to 11.

Figure 9:
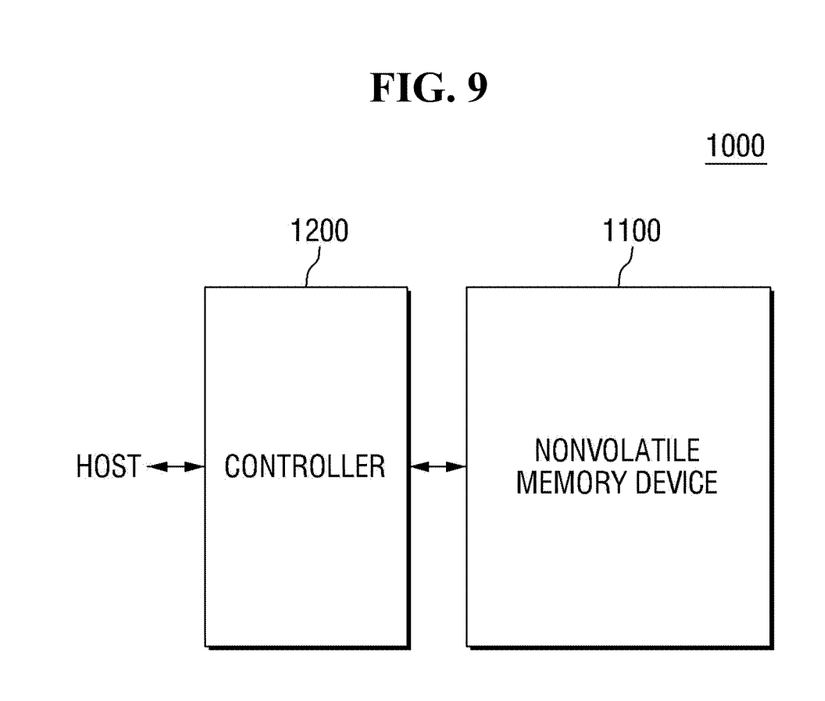
FIG. 9 is a block diagram for explaining a memory system in accordance with some example embodiments.

FIG. 9 is a block diagram for explaining a memory system in accordance with some example embodiments. FIG. 10 is a block diagram showing an application example of the memory system of FIG. 9. FIG. 11 is a block diagram showing a computing system including the memory system described with reference to FIG. 10.

In the following description, a non-volatile memory device will be mentioned as an example of the storage medium 40 (see FIG. 1) to describe various application examples. However, the example embodiments are not limited thereto. The storage medium 40 (see FIG. 1) may be modified in any way and may be, for example, a hard disk.

Referring to FIG. 9, a memory system 1000 includes a nonvolatile memory device 1100 and a controller 1200.

The nonvolatile memory device 1100 may include the PFI directory entry capable of storing additional information on the storage file to be compatible with the FAT file system as described above.

The controller 1200 is connected to a host and the nonvolatile memory device 1100. In response to the request of the host, the controller 1200 is configured to access the nonvolatile memory device 1100. For example, the controller 1200 is configured to control the read, write, erase and background operations of the nonvolatile memory device 1100. The controller 1200 is configured to provide an interface between the nonvolatile memory device 1100 and the host. The controller 1200 is configured to operate a firmware for controlling the nonvolatile memory device 1100.

The controller 1200 may further include well-known components such as a random access memory (RAM), a processing unit, a host interface, and a memory interface. The RAM is used as at least one of an operation memory of the processing unit, a cache memory between the nonvolatile memory device 1100 and the host, and a buffer memory between the nonvolatile memory device 1100 and the host. The processing unit controls all operations of the controller 1200.

The host interface includes a protocol for performing data exchange between the host and the controller 1200. For example, the controller 1200 is configured to perform communication with the outside (host) through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol. The memory interface interfaces with the nonvolatile memory device 1100. For example, the memory interface includes a NAND interface or NOR interface.

The memory system 1000 may be configured to additionally include an error correction block. The error correction block is configured to detect and correct an error of data read from the nonvolatile memory device 1100 using an error correction code (ECC). As an example, the error correction block is provided a component of the controller 1200. The error correction block may be provided as a component of the nonvolatile memory device 1100.

The controller 1200 and the nonvolatile memory device 1100 may be integrated as one semiconductor device. The controller 1200 and the nonvolatile memory device 1100 may be integrated as one semiconductor device to constitute a memory card. For example, the controller 1200 and the nonvolatile memory device 1100 may be integrated as one semiconductor device to constitute a memory card such as a PC card (personal computer memory card international association (PCMCIA)), a compact flash card (CF), a smart media card (SM, SMC), a memory stick, a multimedia card (MMC, RS-MMC, MMCmicro), a SD card (SD, miniSD, microSD, SDHC), a universal flash storage device (UFS) and the like.

The controller 1200 and the nonvolatile memory device 1100 may be integrated as one semiconductor device to constitute a semiconductor drive (solid state drive (SSD)). The semiconductor drive (SSD) includes a storage device configured to store data in a semiconductor memory. If the memory system 1000 is used as the semiconductor drive (SSD), an operation speed of the host connected to the memory system 1000 is dramatically improved.

As another example, the memory system 1000 is provided as one of various components of an electronic apparatus such as a computer, ultra mobile PC (UMPC), workstation, net-book, personal digital assistants (PDA), portable computer, web tablet, wireless phone, mobile phone, smart phone, e-book, portable multimedia player (PMP), portable game console, navigation device, black box, digital camera, television, digital audio recorder, digital audio player, digital picture recorder, digital picture player, digital video recorder, digital video player, apparatus capable of transmitting and receiving information in wireless environment, one of various electronic apparatuses constituting the home network, one of various electronic apparatuses constituting the computer network, one of various electronic apparatuses constituting the telematics network, RFID device, and one of various components forming the computing system.

The nonvolatile memory device 1100 or the memory system 1000 may be mounted as various types of packages. For example, the nonvolatile memory device 1100 or the memory system 1000 may be mounted as a package such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flat pack (TQFP), small outline (SOIC), shrink small outline package (SSOP), thin small outline (TSOP), thin quad flat pack (TQFP), system in package (SIP), multi chip package (MCP), wafer-level fabricated package (WFP), wafer-level processed stack package (WSP).

Figure 10:
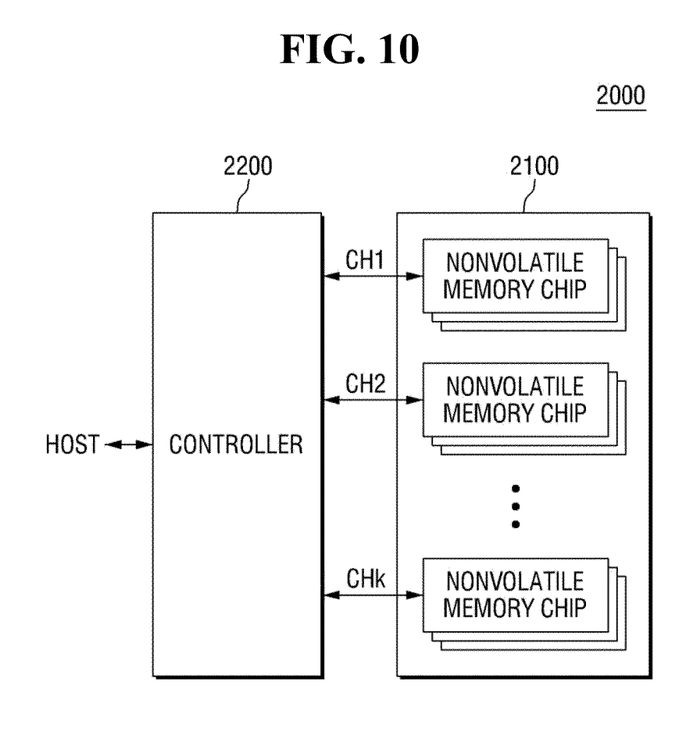
FIG. 10 is a block diagram showing an application example of the memory system of FIG. 9.

Referring to FIG. 10, a memory system 2000 includes a nonvolatile memory device 2100 and a controller 2200. The nonvolatile memory device 2100 includes a plurality of nonvolatile memory chips. The nonvolatile memory chips are classified into a plurality of groups. Each group of the nonvolatile memory chips is configured to perform communication with the controller 2200 via one common channel. For example, the nonvolatile memory chips perform communication with the controller 2200 via first to k-th channels CH1 to CHk.

A case where a plurality of nonvolatile memory chips are connected to one channel has been illustrated in FIG. 10. However, it can be understood that the memory system 2000 may be modified such that one nonvolatile memory chip is connected to one channel.

Figure 11:
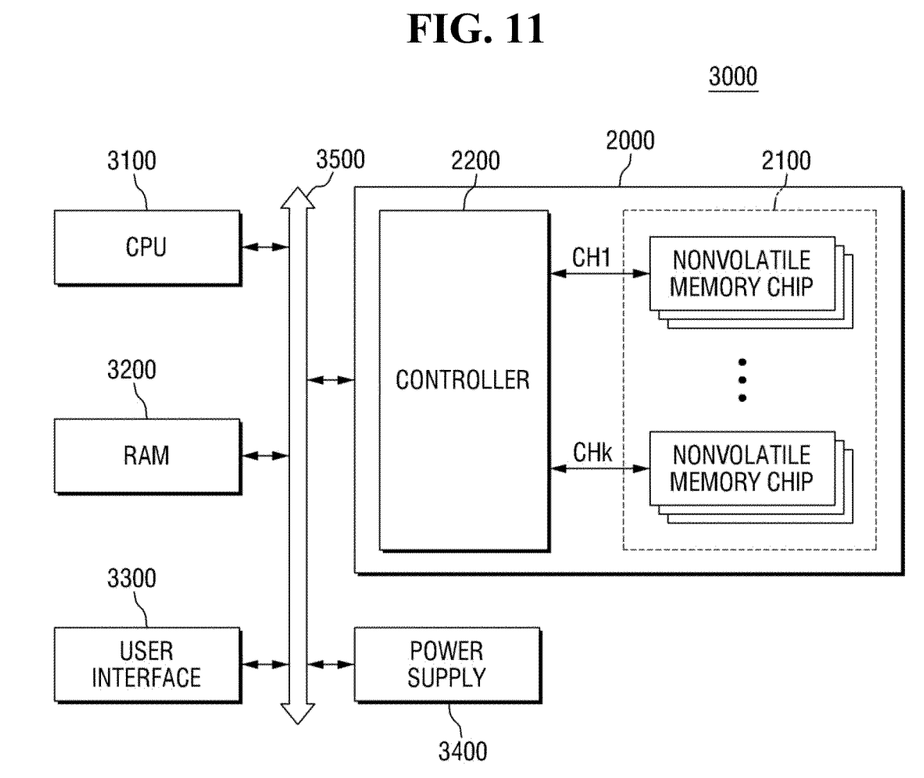
FIG. 11 is a block diagram showing a computing system including the memory system described with reference to FIG. 10.

Referring to FIG. 11, a computing system 3000 includes a central processing unit 3100, a random access memory (RAM) 3200, a user interface 3300, a power supply 3400, and the memory system 2000.

The memory system 2000 is electrically connected to the central processing unit 3100, the RAM 3200, the user interface 3300 and the power supply 3400 via a system bus 3500. The data provided through the user interface 3300 or processed by the central processing unit 3100 is stored in the memory system 2000.

FIG. 11 illustrates a case where the nonvolatile memory device 2100 is connected to the system bus 3500 through the controller 2200. However, the nonvolatile memory device 2100 may be configured to be directly connected to the system bus 3500.

A case of providing the memory system 2000 described with reference to FIG. 10 has been illustrated in FIG. 11. However, the memory system 2000 may be replaced by the memory system 1000 described with reference to FIG. 9.

For instance, the computing system 3000 may be configured to include all of the memory systems 1000 and 2000 described with reference to FIGS. 9 and 10.

In concluding the detailed description, those skilled in the art will appreciate that many variations and modifications can be made to the example embodiments without substantially departing from the principles of the present invention. Therefore, the disclosed example embodiments of the invention are used in a generic and descriptive sense only and not for purposes of limitation.

What is claimed is:

1. A computing system comprising:
a storage device; and
a file system configured to store a file in the storage device by a processor, the file system including,
a personality oriented file information (PFI) directory entry including a first directory entry having a file allocation table (FAT) structure, and a second directory entry having a structure different from that of the first directory entry, the second directory entry including additional information instructing an access device on at least one parameter associated with storage of the file, and
an entry table including location information of the PFI directory entry, wherein,
the second directory entry includes a first region storing additional information on a storage file, and a second region storing information for compatibility with the FAT structure,
the first region includes a type field storing a type value indicating a type of the additional information, a PFI field storing the additional information and a PFI number field indicating a number of the PFI fields included in the second directory entry, and
the second directory entry includes a plurality of type fields and a plurality of PFI fields, a number of the plurality of type fields included in the second directory entry is equal to the number of the plurality of PFI fields included in the second directory entry and if each of the plurality of type fields has a size of 1 and each of the plurality of PFI fields has a size of k, k being a natural number, a number n of the plurality of PFI fields is determined by the following equation:

$$n=24/(1+k),$$

where n is a natural number.

2. The computing system of claim 1, wherein the at least one parameter associated with the storage of the file includes at least one of location information indicating the location where the file has been stored, weather information indicating at least one weather condition when the file has been stored, and voice information including voice data of a user who has created the file.

3. The computing system of claim 1, wherein the first directory entry further includes an extension directory entry having a long file name (LFN) structure.

4. The computing system of claim 1, wherein the first region includes a type field storing a type value indicating a type of the additional information and a PFI field storing the additional information.

5. The computing system of claim 4, wherein the first region further includes an attribute field storing an attribute value of the additional information.

6. The computing system of claim 1, wherein the second region further includes an error check field storing an error check value for checking if there is an error in the additional information.

7. The computing system of claim 1, wherein the PFI directory entry includes N second directory entries, and a maximum value of N is 79.

8. A file storing method comprising:
receiving, by a processor, additional information on a file; and
storing, by the processor, the additional information on the file in a PFI directory entry, wherein
the PFI directory entry includes a first directory entry having a FAT structure, and a second directory entry,
the storing stores the additional information in a first region of the second directory entry and stores information for compatibility of the additional information with the FAT structure in a second region of the second directory entry,
the first region includes a type field storing a type value indicating a type of the additional information, a PFI field storing the additional information and a PFI number field indicating a number of the PFI fields included in the second directory entry, and
the second directory entry includes a plurality of type fields and a plurality of PFI fields, a number of the plurality of type fields included in the second directory entry is equal to the number of the plurality of PFI fields included in the second directory entry and if each of the plurality of type fields has a size of 1 and each of the plurality of PFI fields has a size of k, k being a natural number, a number n of the plurality of PFI fields is determined by the following equation:

$$n=24/(1+k),$$

where n is a natural number.

9. The file storing method of claim 8, further comprising:
storing an entry table including location information of the PFI directory entry in the storage medium.

10. The file storing method of claim 8, wherein the additional information on the file is provided by an application system.

11. The file storing method of claim 8, wherein the additional information includes at least one of location information indicating the location where the file has been stored, weather information indicating at least one weather condition when the file has been stored, and voice information including voice data of a user who has created the file.

12. A memory configured to,
store a file having a first file structure to a storage medium by a controller,
receive additional information regarding the file by the controller, and
link the additional information to the file by the controller so that accessing, duplicating or moving the file also accesses, duplicates and moves the additional information, the additional information including a first portion having the first file structure and a second portion having a second file structure, the second file structure being different than the first file structure, the second file structure including a first region for storing the additional information and a second region for storing information for compatibility of the additional information with the first structure, the first region including a type field storing a type value indicating a type of the additional information, a PFI field storing the additional information and a PFI number field indicating a number of the PFI fields included in the second directory entry, wherein the second directory entry includes a plurality of type fields and a plurality of PFI fields, a number of the plurality of type fields included in the second directory entry is equal to the number of the plurality of PFI fields included in the second directory entry and if each of the plurality of type fields has a size of 1 and each of the plurality of PFI fields has a size of k, k being a natural number, a number n of the plurality of PFI fields is determined by the following equation:

$$n=24/(1+k),$$

where n is a natural number.

13. The memory of claim 12, wherein the additional information includes at least one of location information indicating the location where the file has been stored, weather information indicating at least one weather condition when the file has been stored and voice information including voice data of the user who created the storage file.

14. The memory of claim 12, wherein the first file structure is a file allocation table (FAT) structure.

* * * * *